(12) United States Patent
Borrelli et al.

(10) Patent No.: US 11,198,639 B2
(45) Date of Patent: Dec. 14, 2021

(54) MULTICOLORED PHOTOSENSITIVE GLASS-BASED PARTS AND METHODS OF MANUFACTURE

(71) Applicant: CORNING INCORPORATED, Corning, NY (US)

(72) Inventors: Nicholas Francis Borrelli, Elmira, NY (US); Matthew Wade Fenton, Elmira, NY (US); Timothy James Kiczenski, Corning, NY (US); Michelle Diane Pierson-Stull, Painted Post, NY (US)

(73) Assignee: Corning Incorporated, Corning, NY (US)

(*) Notice: Subject to any disclaimer, the term of this patent is extended or adjusted under 35 U.S.C. 154(b) by 372 days.

(21) Appl. No.: 15/619,942

(22) Filed: Jun. 12, 2017

(65) Prior Publication Data
US 2017/0355636 A1 Dec. 14, 2017

Related U.S. Application Data (60) Provisional application No. 62/349,486, filed on Jun. 13, 2016.

(51) Int. Cl.

| | | |
|---|---|---|
| *C03C 4/04* | (2006.01) |
| *C03C 14/00* | (2006.01) |
| *C03C 4/02* | (2006.01) |
| *C03C 21/00* | (2006.01) |
| *C03C 3/097* | (2006.01) |
| *C03C 4/08* | (2006.01) |
| *C03C 3/095* | (2006.01) |
| *C03C 3/083* | (2006.01) |
| *C03C 3/085* | (2006.01) |
| *C03C 23/00* | (2006.01) |
| *B82Y 20/00* | (2011.01) |

(52) U.S. Cl.
CPC ............... *C03C 4/04* (2013.01); *C03C 3/083* (2013.01); *C03C 3/085* (2013.01); *C03C 3/095* (2013.01); *C03C 3/097* (2013.01); *C03C 4/02* (2013.01); *C03C 4/085* (2013.01); *C03C 14/006* (2013.01); *C03C 21/002* (2013.01); *C03C 21/005* (2013.01); *C03C 23/002* (2013.01); *B82Y 20/00* (2013.01)

(58) Field of Classification Search
CPC ....................................................... C03C 4/04
See application file for complete search history.

(56) References Cited

U.S. PATENT DOCUMENTS

| | | | |
|---|---|---|---|
| 2,515,275 A | 7/1950 | Stookey |
| 2,515,936 A | 7/1950 | Armistead, Jr. |
| 2,515,937 A | 7/1950 | Stookey |
| 2,515,938 A | 7/1950 | Stookey |
| 2,515,940 A | 7/1950 | Stookey |
| 2,628,160 A | 2/1953 | Stookey |
| 2,651,145 A | 9/1953 | Stookey |
| 2,684,911 A | 7/1954 | Stookey |
| 2,971,853 A | 2/1961 | Stookey |
| 3,663,193 A | 5/1972 | Wilson |
| 4,057,408 A | 11/1977 | Pierson et al. |
| 4,480,044 A * | 10/1984 | McAlinn .................. C03C 10/00 501/4 |
| 5,078,771 A | 1/1992 | Wu |
| 9,156,724 B2 | 10/2015 | Gross |
| 2003/0087242 A1* | 5/2003 | Mirkin ................. C12Q 1/6816 506/4 |
| 2004/0126698 A1* | 7/2004 | Borrelli ................... C03C 3/095 430/270.1 |
| 2005/0141847 A1* | 6/2005 | Schroeder ............... C03C 3/112 385/147 |
| 2006/0254504 A1* | 11/2006 | Dai ................... H01L 21/76849 117/84 |
| 2009/0062102 A1* | 3/2009 | Borrelli ................... C03C 3/083 501/64 |
| 2009/0209420 A1* | 8/2009 | Kalgutkar ................. B32B 5/16 503/201 |
| 2011/0122091 A1* | 5/2011 | King ..................... G06F 3/0421 345/175 |
| 2011/0195360 A1 | 8/2011 | Flemming et al. |
| 2012/0236526 A1* | 9/2012 | Weber ................... C03C 21/002 361/807 |
| 2012/0286502 A1* | 11/2012 | Mahabadi ............ C09D 11/322 283/72 |
| 2013/0136909 A1 | 5/2013 | Mauro et al. |

(Continued)

FOREIGN PATENT DOCUMENTS

| | | | | |
|---|---|---|---|---|
| DE | 102005043516 A1 * | 3/2007 | ............ B41M 5/262 |
| DE | 102005043516 A1 | 3/2007 |

(Continued)

OTHER PUBLICATIONS

Qu et al., "Optical nonlinearities of space selectively precipitated Au nanoparticles inside glasses", 2003, Chemical Physics Letters, Elsevier, 368 , pp. 352-358. (Year: 2003).*

Nath et al., "Label-Free Biosensing by Surface Plasmon Resonance of Nanoparticles on Glass: Optimization of Nanoparticle Size", 2004, Analytical Chemistry, American Chemical Society, vol. 76, No. 18, pp. 5370-5378. (Year: 2004).*

International Search Report and Written Opinion PCT/US2017/037150 dated Sep. 7, 2017.

Taiwanese Patent Application No. 106119601, Office Action dated Mar. 8, 2021, 3 pages (English Translation Only); Taiwanese Patent Office.

(Continued)

*Primary Examiner* — Elizabeth A. Bolden (57) ABSTRACT

Multicolored glass-based articles and methods of manufacture are disclosed. The method includes forming a glass-based part and exposing a first region to radiation and a second region to radiation such that the first and second regions have different sized metallic nanoparticles, resulting in a multicolored glass article.

15 Claims, 6 Drawing Sheets

(4 of 6 Drawing Sheet(s) Filed in Color)

(56) References Cited

U.S. PATENT DOCUMENTS

| | | | | |
|---|---|---|---|---|
| 2013/0213477 A1* | 8/2013 | Nakayama | ............ | H01L 51/447 136/263 |
| 2013/0225390 A1* | 8/2013 | Ellison | .................... | C03C 3/093 501/66 |
| 2015/0225287 A1* | 8/2015 | Amin | ..................... | A01N 25/08 428/410 |
| 2015/0259244 A1* | 9/2015 | Amin | ..................... | C03C 3/091 428/410 |
| 2015/0291468 A1* | 10/2015 | Boek | ....................... | C03B 17/02 428/410 |
| 2015/0366073 A1* | 12/2015 | Magdassi | ............... | B22F 3/008 174/257 |
| 2016/0122229 A1* | 5/2016 | Bowden | ................. | C03C 3/087 501/67 |
| 2019/0047258 A1* | 2/2019 | Suematsu | .............. | H05B 33/02 |
| 2019/0267551 A1* | 8/2019 | Sims | .................... | C09D 11/102 |

FOREIGN PATENT DOCUMENTS

| | | |
|---|---|---|
| JP | 52-085211 A | 7/1977 |
| JP | 2004-339001 A | 12/2004 |
| JP | 2009-057222 A | 3/2009 |
| TW | 201140402 A | 11/2011 |
| WO | 2012/124758 A1 | 9/2012 |
| WO | 2015036426 A1 | 3/2015 |

OTHER PUBLICATIONS

Japanese Patent Application No. 2019-517197, Office Action dated Apr. 7, 2021, 26 pages (11 pages of English Translation and 15 pages of Original Document), Japanese Patent Office.

Chinese Patent Application No. 201780036857.0, Office Action dated Jun. 16, 2021, 10 pages (5 pages of English Translation and 5 pages of Original Document), Chinese Patent Office.

Tong, "Frontiers of Nanophotonics Research", Shanghai Jiao Tong University Press, 2014, 12 pages (2 pages of English Translation and 10 pages of Original Document).

\* cited by examiner

MULTICOLORED PHOTOSENSITIVE GLASS-BASED PARTS AND METHODS OF MANUFACTURE

CROSS-REFERENCE TO RELATED APPLICATIONS

This application claims the benefit of priority of U.S. Provisional Application Ser. No. 62/349,486 filed Jun. 13, 2016, the entirety of which is incorporated herein by reference.

FIELD

Embodiments of the disclosure generally relate to glass-based articles, such as multicolored glass-based articles, and methods for manufacturing the same.

BACKGROUND

Glass-based articles, and in particular strengthened glass-based articles, are widely used in electronic devices as cover plates or windows for portable or mobile electronic communication and entertainment devices, such as mobile phones, smart phones, tablets, video players, information terminal (IT) devices, laptop computers, navigation systems and the like, as well as in other applications such as architecture (e.g., windows, shower panels, countertops), transportation (e.g., automotive, trains, aircraft, sea craft), appliances, or any application that requires superior fracture resistance but thin and light-weight articles. Glass-based articles having multiple colors and/or in various patterns would enable a variety of aesthetically pleasing glass-based articles to be manufactured.

Therefore, it would be desirable to provide methods for manufacturing multicolored glass-based articles. In addition, it would be desirable to provide methods for manufacturing chemically strengthened (e.g., ion-exchanged) multicolored glass-based articles.

SUMMARY

Aspect (1) of the disclosure provides an article. The article comprises a glass-based substrate. The glass-based substrate comprises: a first region containing metallic nanoparticles of a component with a first average particle diameter; and a second region containing metallic nanoparticles of the component with a second average particle diameter that is different than the first average particle diameter.

Aspect (2) of the disclosure provides the article of aspect (1), wherein the glass-based substrate comprises: 40-85 mol % $SiO_2$; 0-30 mol % $Al_2O_3$; 0-20 mol % $B_2O_3$; 0-10 mol % $P_2O_5$; 0-30 mol % $Li_2O+Na_2O+K_2O+Rb_2O$; 0-30 mol % MgO+CaO+SrO+BaO; 0-10 mol % of ZnO; 0-10 mol % $ZrO_2$; 0-10 mol % $Y_2O_3$; 0-10 mol % $La_2O_3$; 0-10 mol % NiO; >0-5 mol % Au; and 0-5 mol % of $CeO_2$.

Aspect (3) of the disclosure provides the article of aspects (1) or (2), wherein the glass-based substrate comprises: 55-75 mol % $SiO_2$; 10-20 mol % $Al_2O_3$; 0-5 mol % $B_2O_3$; 0-5 mol % $P_2O_5$; 10-25 mol % $Li_2O+Na_2O+K_2O+Rb_2O$; 0-10 mol % MgO+CaO+SrO+BaO; 0-5 mol % of ZnO; 0-5 mol % $ZrO_2$; 0-5 mol % $Y_2O_3$; 0-5 mol % $La_2O_3$; 0-5 mol % NiO; 0.001-0.1 mol % Au; and >0-1 mol % of $CeO_2$.

Aspect (4) of the disclosure provides the article of any of aspects (1) to (3), wherein the component is selected from the group consisting of Au, Ag, and Cu.

Aspect (5) of the disclosure provides the article of any of aspects (1) to (4), wherein the component is Au.

Aspect (6) of the disclosure provides the article of any of aspects (1) to (5), wherein the glass-based substrate further comprises a photosensitizer.

Aspect (7) of the disclosure provides the article of any of aspects (1) to (6), The article of any of the preceding claims, wherein the glass-based substrate further comprises $CeO_2$.

Aspect (8) of the disclosure provides the article of any of aspects (1) to (7), wherein the first region has a hue angle outside the range of 90° to 170°.

Aspect (9) of the disclosure provides the article of any of aspects (1) to (8), wherein the second region is substantially free of metallic nanoparticles of the component, and is substantially colorless.

Aspect (10) of the disclosure provides the article of any of aspects (1) to (9), wherein the second region has a hue angle that is different than a hue angle of the first region.

Aspect (11) of the disclosure provides the article of any of aspects (1) to (10), wherein the glass-based substrate further comprises a third region containing metallic nanoparticles of the component with a third average particle diameter, and the third average particle diameter is different than the first average particle diameter and the second average particle diameter.

Aspect (12) of the disclosure provides the article of any of aspects (1) to (11), wherein the first average particle diameter is about 50 nm to about 250 nm.

Aspect (13) of the disclosure provides the article of any of aspects (1) to (12), wherein the glass-based substrate comprises a compressive stress layer extending from a surface of the glass-based substrate to a depth of compression.

Aspect (14) of the disclosure provides the article of any of aspects (1) to (13), wherein the glass-based substrate has a thickness of less than about 3 mm.

Aspect (15) of the disclosure provides a consumer electronic product. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least one of a portion of the housing or the cover glass comprises the article of any of aspects (1) to (14).

Aspect (16) of the disclosure provides a method. The method comprises: irradiating a first region of a glass-based substrate with an ultra-violet source to form an irradiated glass-based substrate comprising metallic nanoparticle nuclei in the first region; and heat treating the irradiated glass-based substrate to form a heat treated glass-based substrate comprising metallic nanoparticles of a component in the first region; wherein the heat treated glass-based substrate comprises a second region containing metallic nanoparticles of the component with a second average particle diameter that is different than the first average particle diameter.

Aspect (17) of the disclosure provides the method of aspect (16), further comprising disposing a mask between the glass-based substrate and the ultra-violet source prior to irradiating the glass-based source.

Aspect (18) of the disclosure provides the method of aspect (17), wherein the mask is ink jet printed.

Aspect (19) of the disclosure provides the method of aspects (17) or (18), wherein the mask reduces the intensity of the irradiation with the ultra-violet source at the second region relative to the first region.

Aspect (20) of the disclosure provides the method of any of aspects (17) to (19), further comprising removing the mask after irradiating the glass-based substrate.

Aspect (21) of the disclosure provides the method of any of aspects (16) to (20), wherein the component is selected from the group consisting of Au, Ag, and Cu.

Aspect (22) of the disclosure provides the method of any of aspects (16) to (21), wherein the glass-based substrate further comprises a photosensitizer.

Aspect (23) of the disclosure provides the method of any of aspects (16) to (22), wherein the glass-based substrate further comprises $CeO_2$.

Aspect (24) of the disclosure provides the method of any of aspects (16) to (23), further comprising a second irradiating of the glass-based substrate with an ultra-violet source from a second direction, wherein irradiating the first region of the glass-based substrate is from a first direction, and the first direction is different from the second direction.

Aspect (25) of the disclosure provides the method of any of aspects (16) to (24), wherein the heat treating of the glass-based substrate is the only heat treatment of the glass-based substrate.

Aspect (26) of the disclosure provides the method of any of aspects (16) to (25), wherein the irradiated glass-based substrate exhibits substantially no color change relative to the glass-based substrate.

Aspect (27) of the disclosure provides the method of any of aspects (16) to (26), further comprising ion exchanging the heat-treated glass-based substrate.

Aspect (28) of the disclosure provides the method of any of aspects (16) to (27), further comprising forming the glass-based substrate with a down-draw process.

Aspect (29) of the disclosure provides the method of any of aspects (16) to (28), wherein the glass-based substrate comprises: 40-85 mol % $SiO_2$; 0-30 mol % $Al_2O_3$; 0-20 mol % $B_2O_3$; 0-10 mol % $P_2O_5$; 0-30 mol % $Li_2O+Na_2O+K_2O+Rb_2O$; 0-30 mol % MgO+CaO+SrO+BaO; 0-10 mol % of ZnO; 0-10 mol % $ZrO_2$; 0-10 mol % $Y_2O_3$; 0-10 mol % $La_2O_3$; 0-10 mol % NiO; >0-5 mol % Au; and 0-5 mol % of $CeO_2$.

Aspect (30) of the disclosure provides the method of any of aspects (16) to (29), wherein the heat treating takes place at a temperature of about 500° C. to about 900° C. for about 0.5 hours to about 4 hours.

Aspect (31) of the disclosure provides the method of any of aspects (16) to (30), wherein irradiating the glass-based substrate occurs for about 0.1 hours to about 10 hours at an intensity of about 1 mW to about 20 mW.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments," or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments. The various glass-based articles and methods described herein can be selected from an architectural glass-based substrate, a vehicle glazing, a vehicle interior glass-based substrate, an appliance glass-based substrate, a handheld device glass-based substrate (such as a part used as a screen cover or housing), and a wearable device glass-based substrate.

As used herein, the terms "glass-based article," "glass-based substrate," "glass-based part," and "glass-based cover" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %). Glass substrates and articles according to one or more embodiments can be selected from soda lime glass, alkali aluminosilicate glass, alkali containing borosilicate glass, and alkali aluminoborosilicate glass. In one or more embodiments, the substrate or part is a glass or glass-ceramic, and the glass or glass-ceramic can be strengthened, for example, heat strengthened, tempered glass/glass-ceramic, or chemically strengthened glass/glass-ceramic. In one or more embodiments, strengthened glass-based substrates or articles have a compressive stress (CS) layer with a CS extending within the chemically strengthened glass-based substrate from a surface of the chemically strengthened glass-based substrate to a compressive stress depth of layer (DOL) of at least 10 μm to several tens of microns deep. In one or more embodiments, the glass-based substrate is a chemically strengthened glass-based substrate.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant.

One or more embodiments of the disclosure provide multicolored glass-based articles including a continuous multicolored glass-based substrate. The multicolored glass-based articles or substrates can be planar, or they can be curved in one or more directions (e.g., x, y and/or z planes) to provide a three-dimensional substrate or article. The glass-based substrates or articles can be cold-formed. In one or more embodiments, the substrates or articles are curved in at least one direction (e.g., x, y and/or z planes). In one or more embodiments, the glass-based substrates or articles can have 2.5-dimensionality, for example, by having beveled edges.

The glass-based substrates may have any appropriate size and shape. In some embodiments, the glass-based substrates may have a thickness of less than about 3 mm, such as less than about 2.5 mm, about 2 mm, about 1.5 mm, about 1 mm, about 0.7 mm, about 0.5 mm, or less. In some embodiments, the glass based articles may be provided in the form of glass blanks, such as glass blanks with at least one dimension greater than 3 mm.

The glass-based substrates may contain a first component, where the first component is capable of forming metallic particles that exhibit the surface plasmon effect. The first component may be selected from, but is not limited to, gold (Au), silver (Ag), copper (Cu), and mixtures thereof. The first component is preferably gold. The content of the first component may be in the range of greater than 0 mol % to about 5 mol %, such as from 0.001 mol % to about 0.1 mol %. The first component may be in the form of nanoparticles distributed throughout at least a portion of the continuous glass-based substrate. As utilized herein, "nanoparticle" refers to a particle that has at least one dimension in the nanometer regime (1 nm to 1,000 nm). The size of the metallic particles of the first component directly correlates to the observed color of the region of the glass-based substrate containing the metallic nanoparticles. In some embodiments, the metallic nanoparticles may have an average particle diameter of about 1 nm to about 500 nm, such as about 1 nm to about 400 nm, about 1 nm to about 300 nm, about 1 nm to about 200 nm, about 1 nm to about 100 nm, about 50 nm to about 250 nm, about 5 nm to about 20 nm, or any sub-ranges contained therein. As utilized herein, the average particle diameter is measured by scanning electron microscopy (SEM). In general, concentration of the nanoparticles, which may be demonstrated by particle-to-particle spacing, may increase with increasing UV radiation exposure.

In some embodiments, the continuous glass-based substrate may contain a first region having metallic nanoparticles of the first component with a first average particle diameter. A second region of the glass-based substrate may contain metallic nanoparticles of the first component with a second average particle diameter that is different than the first average particle diameter. This difference in average particle diameters produces a difference in observed color between the first and second regions. As utilized herein, a region that is substantially free or free of metallic nanoparticles is considered to contain metallic nanoparticles with an average metallic nanoparticle particle diameter of 0 nm and/or metallic particles that are too small to produce color. In some embodiments, the continuous glass-based substrate may contain additional regions, such as a third region, containing metallic nanoparticles with an average particle size that is different than the average particle size of the metallic nanoparticles in other regions of the continuous glass-based substrate. The continuous glass-based substrate may contain at least two differently colored regions, and in some embodiments may include more than two differently colored regions. The continuous glass-based substrate is considered to be "multicolored" when containing at least two differently colored regions, with a clear or colorless region being considered a colored region for this purpose.

The glass-based substrate may exhibit a variety of colors. In some embodiments, the glass-based substrate may exhibit colors having hue angles other than 90° to 170°. Stated differently, the glass-based substrate may exhibit colors having hue angles of 0° to 90° and 170° to 360°. In some embodiments, the saturation values (C) of the colors exhibited by the glass-based substrate may be in the range from 1 to 40. In some embodiments, the saturation values (C) greater than 30 have been exhibited. The glass-based substrate may exhibit colors with an L* value of 80 to 65, an a* value of −5 to 40, and a b* value of −15 to 5. The colors exhibited by the glass-based substrate may include pinks, blues, magentas, and reds. In some embodiments, the glass-based substrate exhibits one or more colors together with a colorless region.

The glass-based substrates are photosensitive. In some embodiments, the glass-based substrates may contain a photosensitizer as a second component. In some embodiments, the photosensitizer may include a metal oxide that reacts to ultraviolet radiation to form an electron-hole pair in the glass-based substrate. The electron-hole pair may then interact with the band gap of the glass-based substrate such that the electron exists for a time sufficient to interact with the first component and form nuclei capable of nucleating metallic nanoparticles of the first component.

The photosensitizer may include any photosensitizer employed in the art. In some embodiments, the photosensitizer may be cerium oxide, europium oxide, copper oxide, or combinations thereof. The content of the photosensitizer may be about 0 mol % to about 5 mol %, such as greater than 0 mol % to about 4 mol %, greater than 0 mol % to about 3 mol %, greater than 0 mol % to about 2 mol %, greater than 0 mol % to about 1 mol %, or any sub-ranges contained therein. In some embodiments, the photosensitizer may not be required when a UV radiation source is employed having an energy that exceeds the band gap of the glass-based substrate.

The glass-based substrates may be referred to as continuous. As utilized herein, a "continuous glass-based" substrate refers to a glass-based substrate that is a single piece and has a single bulk composition.

In some embodiments, the multicolored glass-based substrates may be referred to as having a depth of color. In some embodiments, the multicolored glass-based articles may include periodic arrangements of lines or gratings, and the multicolored glass-based articles may in some embodiments exhibit color gradients.

In some embodiments, the multicolored glass-based articles may have a textured surface to provide a better "feel to the hand." The textured surface may alternatively be referred to as a "hazed" surface, and may have a range of roughnesses that provide a "hand-feel" ranging anywhere from "sticky-smooth" to "velvety-soft" to "rough." In some embodiments, the texture may be implemented in such a way as to compliment or align with the colored pattern.

According to one or more embodiments, glass-based articles are provided which further include a coating. In one or more embodiments, glass-based articles include a coating applied for functions such as scratch resistance, protection from damage (such as sharp contact induced fracture), antimicrobial properties, antireflective properties, capacitive touch sensitivity, photocromic coatings, or other optical qualities. The coatings can be applied by any suitable technique, such as chemical vapor deposition (e.g., plasma enhanced chemical vapor deposition, low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation, and/or atomic layer deposition. The coatings can also be applied by dip-coating, spraying, brushing, spin-coating and other suitable coating application techniques.

In some embodiments, the glass-based substrate may have a bulk composition including: 40-85 mol % $SiO_2$; 0-30 mol % $Al_2O_3$; 0-20 mol % $B_2O_3$; 0-10 mol % $P_2O_5$; 0-30 mol % $Li_2O+Na_2O+K_2O+Rb_2O$; 0-30 mol % $MgO+CaO+SrO+BaO$; 0-10 mol % of ZnO; 0-10 mol % $ZrO_2$; 0-10 mol % $Y_2O_3$; 0-10 mol % $La_2O_3$; 0-10 mol % NiO; >0-5 mol % Au; and 0-5 mol % of $CeO_2$. In another embodiment, the glass-based substrate may have a bulk composition including: 55-75 mol % $SiO_2$; 10-20 mol % $Al_2O_3$; 0-5 mol % $B_2O_3$; 0-5 mol % $P_2O_5$; 10-25 mol % $Li_2O+Na_2O+K_2O+Rb_2O$; 0-10 mol % $MgO+CaO+SrO+BaO$; 0-5 mol % of ZnO; 0-5 mol % $ZrO_2$; 0-5 mol % $Y_2O_3$; 0-5 mol % $La_2O_3$; 0-5 mol % NiO; 0.001-0.1 mol % Au; and >0-1 mol % of $CeO_2$. In some embodiments, the glass-based substrate may include a concentration of gold, silver, and/or copper that is greater than 0 mol % to 5 mol %, such as 0.001 mol % to 0.01 mol %, 0.001 mol % to 0.1 mol %, 0.001 mol % to 2 mol %, 0.001 mol % to 3 mol %, 0.001 mol % to 4 mol %, or any sub-ranges contained therein.

In some embodiments, the glass-based substrate is ion-exchangeable. In some embodiments, the glass-based substrate is an ion exchangeable alkali aluminosilicate glass composition. In some embodiments, the glass-based substrate includes an ion exchangeable alkali aluminoborosilicate glass composition.

The glass-based articles may be produced by a method including exposing a first region of a glass-based substrate to UV radiation, and then heat treating the UV irradiated glass-based substrate to produce a multicolored glass-based substrate. The colors produced in the glass-based substrate are determined based on the radiation exposure and the heat treatment conditions.

The UV irradiation of the glass-based substrate produces metallic particle nuclei in the irradiated regions. The UV radiation is of sufficient energy to form electron-hole pairs in the glass-based substrate, with the electron surviving for a time period sufficient to interact with metallic components dissolved in the glass-based substrate and form metallic particle nuclei. In some embodiments, the electron-hole pair may be formed by interaction of the UV radiation with a photosensitizing agent in the glass-based substrate. Without wishing to be bound by any particular theory, the metallic particle nuclei may be very small metallic particles that are capable of nucleating the growth of metallic nanoparticles during a subsequent heat treatment step. The concentration of the metallic particle nuclei formed in the glass-based substrate is inversely correlated to the size of the metallic nanoparticles formed during the subsequent heat treatment step, with a greater concentration of metallic particle nuclei producing metallic nanoparticles with a smaller average particle diameter. In this manner, longer radiation exposure times produce regions with smaller gold particles and a red hue. Similarly, the particle size of gold particles with shorter radiation exposure times is increased, producing bluer hues. The color or hue produced in the glass-based substrate may be considered primarily a function of exposure flux during the exposure to radiation. The degree of exposure flux provided in the exposure is expressed as the product of time and intensity. In terms of a formula, Exposure flux=intensity×time.

In some embodiments, the glass-based substrate exposed to the UV radiation source may be in as produced form. For example, the glass-based substrate subjected to UV irradiation may not be subjected to the addition further elements after initial forming, such as through ion exchange or ion implantation.

The UV radiation may be produced by any appropriate UV radiation source. In some embodiments, a UV light may be employed in the manner of a flood exposure. In some embodiments, the UV source may be a collimated xenon lamp. In another embodiment, the UV source may be a laser, and in some embodiments the laser may be moved relative to the glass-based substrate to expose specific regions of the glass-based substrate to the UV radiation. The UV radiation exposure may be carried out for various exposure times and exposure intensities. In some embodiments, the UV radiation exposure may be carried out for about 0.1 hours to about 10 hours, such as about 0.5 hours to about 9 hours, about 1 hours to about 8 hours, about 2 hours to about 7 hours, about 3 hours to about 6 hours, about 4 hours to about 5 hours, or any sub-ranges contained therein. In some embodiments, the UV radiation exposure may be carried out at an intensity of about 1 mW to about 20 mW, such as about 10 mW.

Figure 1:
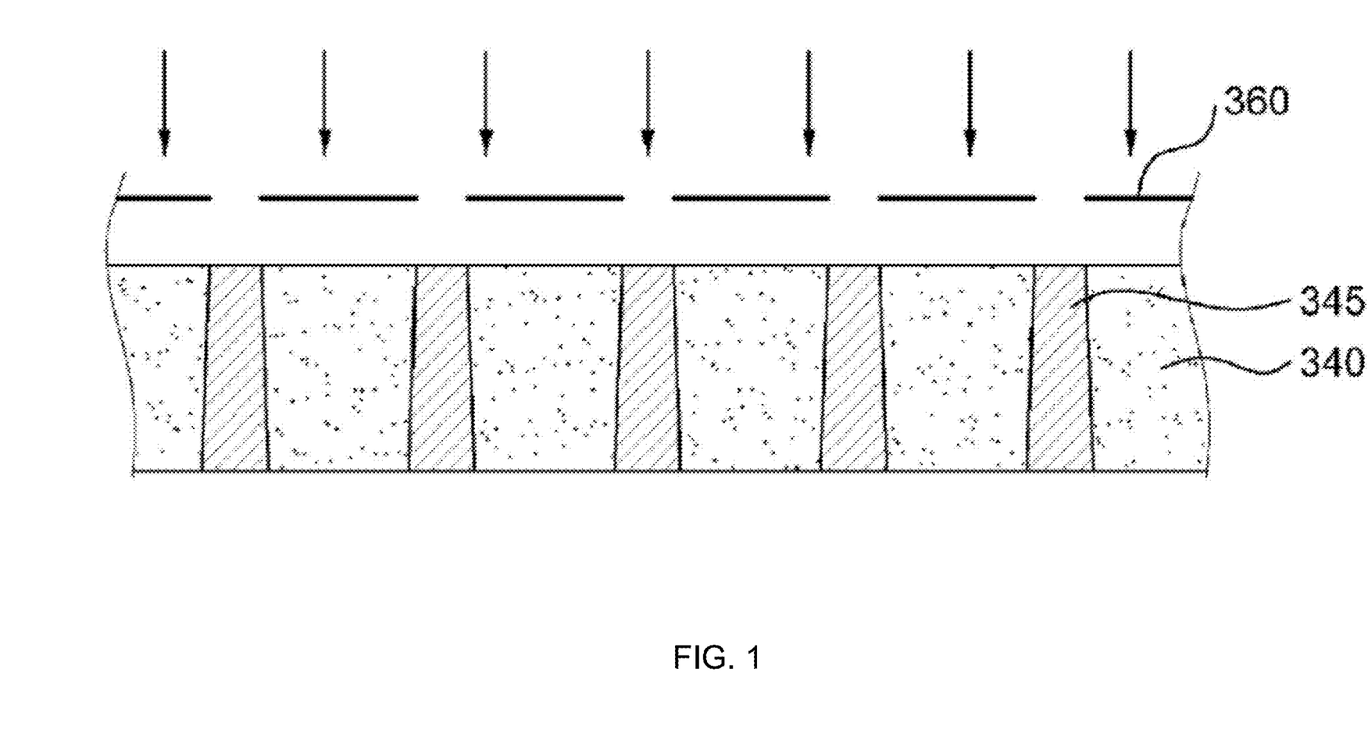
FIG. 1 is a depiction of the exposure of a glass-based part to radiation through a mask.

In some embodiments, a mask may be disposed between the glass-based substrate and a UV source. The use of a mask may be especially attractive when a UV source is employed that produces a flood exposure. Referring to FIG. 1, during the UV exposure a mask 360 may be disposed between a photosensitive glass-based substrate 340 according to some embodiments. The mask 360 provides a radiation blocking pattern, resulting in irradiated regions 345 that are exposed to radiation. As shown in FIG. 1, the radiation is represented by the arrows directed at the mask 360. The radiation exposure time and/or intensity may be varied in different regions of the glass-based substrate 340 to provide irradiated regions 345 having different concentrations of metallic particle nuclei, resulting in different colors after heat treatment.

The mask may be produced by any appropriate process. In some embodiments, the mask may be produced by an ink jet printing process. The mask may be produced directly on a surface of the glass-based substrate or on a transparent carrier substrate, such as a glass carrier substrate. In some embodiments, the mask may be completely opaque to the UV radiation. In another embodiment, the mask may be partially opaque to the UV radiation, and may include at least two regions with different levels of opacity to the UV radiation. The different levels of opacity of the mask produce regions of the glass-based substrate that are exposed to different levels of radiation intensity. In some embodiments, a mask may be disposed between the glass-based substrate and UV radiation sources from multiple directions. For example, a first mask may be disposed between a first surface of the glass-based substrate and a first UV source, and a second mask may be disposed between a second surface of the glass-based substrate and a second UV source. The mask may be removed after the conclusion of the UV radiation exposure, and in some embodiments may be removed before the heat treatment of the irradiated glass-based substrate.

In some embodiments, the direction from which the UV radiation impinges on the glass-based substrate may be changed during the irradiation of the glass-based substrate. In one embodiment, the glass-based substrate may be exposed to UV radiation from front side, and also exposed to UV radiation from a back side. The effectiveness of the UV radiation in producing metallic particle nuclei in the glass-based substrate is reduced as the depth of the UV radiation into the glass-based substrate increases. This may produce a glass-based substrate where the color produced at different depths within the glass-based substrate is different. Exposing the glass-based substrate to UV radiation from different directions, such as opposite directions, may produce a more consistent color across the depth of the glass-based substrate. In some embodiments, the use of various UV impingement angles may enable otherwise unobtainable effects, such as a deep saturated red color in a thick glass substrate.

The glass-based articles may be heat treated under any appropriate conditions. In some embodiments, the heat treatment may include exposing the irradiated glass-based substrate to heat from 150° C. to 1,000° C., such as from 200° C. to 900° C., 300° C. to 800° C., 400° C. to 700° C., 500° C. to 600° C., or any sub-ranges contained therein. The heat treatment may be conducted for a time of from 5 minutes to 24 hours, such as 15 minutes to 18 hours, 30 minutes to 12 hours, 1 hour to 10 hours, or any sub-ranges contained therein. In some embodiments, the heat treatment may be carried out in any appropriate atmosphere, without limitation. In some embodiments, the heat treatment is carried out in an ambient atmosphere or inert atmosphere with substantially equivalent effectiveness.

In some embodiments, multicolored glass-based articles are manufactured with a single exposure to radiation and a single heat treatment step. In some embodiments, the glass-based substrate exhibits no change in color after the UV radiation exposure but prior to the heat treatment. Other photosensitive glass-based materials, such as Joseph glass in which silver decorations are grown on the tips of NaF crystals in the glass, require multiple heat treatment steps, multiple UV exposures, gradient heat treatment steps, or some combination thereof to produce multiple colors.

In some embodiments, the method of producing the glass-based article additionally includes ion-exchanging the glass-based substrate to strengthen the glass-based substrate. In some embodiments, the ion exchange strengthening forms a compressive stress (CS) with a magnitude in a range of 100 MPa to 1,100 MPa, or more, in an outer region of the ion-exchangeable glass or glass-ceramic substrate. In some embodiments, the ion exchange strengthening forms a compressive stress (CS) magnitude in a range of 600 MPa to 1,100 MPa, or more, in an outer region of the ion-exchangeable glass or glass-cermaic substrate. In some embodiments, the ion exchange occurs after the heat treatment of the glass-based article, such that the glass-based article is multicolored prior to the ion exchange treatment.

The continuous glass-based substrates may be produced using a variety of different processes. For example, exemplary glass-based substrate forming methods include float glass processes and down-draw processes, such as fusion draw and slot draw processes. A glass-based substrate prepared by a float glass process may be characterized by smooth surfaces and uniform thickness, and is made by floating molten glass on a bed of molten metal, such as tin. In an exemplary process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further and annealed to reduce internal stress.

Down-draw processes produce glass-based substrates having a uniform thickness that possess relatively pristine surfaces. Because the average flexural strength of the glass-based substrate is controlled by the amount and size of surface flaws, a pristine surface that has had minimal contact has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than about 2 mm. In addition, down drawn glass-based substrates have a very flat, smooth surface that can be used in its final application without additional costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region. In some embodiments, the compositions used for the glass-based substrate may be batched with 0-2 mol % of at least one fining agent selected from a group that includes $Na_2SO_4$, NaCl, NaF, NaBr, $K_2SO_4$, KCl, KF, KBr, and $SnO_2$.

It should be noted that glass-based substrates including glass-ceramics may be strengthened in the same manner as a glass substrate. As used herein, the term "strengthened substrate" may refer to a glass-based substrate that has been chemically strengthened, for example through ion-exchange of larger ions for smaller ions in the surface of the glass-based substrate. However, thermal strengthening methods known in the art, such as thermal tempering or heat strengthening, may be utilized to form strengthened glass-based substrates. In some embodiments, the glass-based substrates may be strengthened using a combination of chemical strengthening processes and thermal strengthening processes.

The glass-based articles can comprise a variety of glass compositions, including soda lime glasses and various aluminosilicate glasses, alkali aluminosilicate glasses, borosilicate glasses, aluminoborosilicate glasses, and alkali aluminoborosilicate glasses. Non limiting examples of glass compositions that can be used to manufacture glass-based articles include a lithium aluminosilicate glass having a composition (in weight %) comprising $SiO_2$ 55-69%, $Al_2O_3$ 18-25%, $Li_2O$ 3-5%, $Na_2O+K_2O$ 0-30%, $MgO+CaO+SrO+BaO$ 0-5%, $ZnO$ 0-4%, $TiO_2$ 0-5%, $ZrO_2$ 0-5%, $TiO_2+ZrO_2+SnO_2$ 2-6%, $P_2O_5$ 0-8%, $F$ 0-1%, and $B_2O_3$ 0-2%. In other embodiments, glass compositions that can be used to manufacture glass-based articles include lithium aluminosilicate glass having a composition (in weight %) comprising $SiO_2$ 57-66%, $Al_2O_3$ 18-23%, $Li_2O$ 3-5%, $Na_2O+K_2O$ 3-25%, $MgO+CaO+SrO+BaO$ 1-4%, $ZnO$ 0-4%, $TiO_2$ 0-4%, $ZrO_2$ 0-5%, $TiO_2+ZrO_2+SnO_2$ 2-6%, $P_2O_5$ 0-7%, $F$ 0-1%, and $B_2O_3$ 0-2%. In other embodiments, glass compositions that can be used to manufacture glass-based articles include a lithium aluminosilicate glass having a composition (in weight %) comprising $SiO_2$ 57-63%, $Al_2O_3$ 18-22%, $Li_2O$ 3.5-5%, $Na_2O+K_2O$ 5-20%, $MgO+CaO+SrO+BaO$ 0-5%, $ZnO$ 0-3%, $TiO_2$ 0-3%, $ZrO_2$ 0-5%, $TiO_2+ZrO_2+SnO_2$ 2-5%, $P_2O_5$ 0-5%, $F$ 0-1%, and $B_2O_3$ 0-2%.

In other embodiments, glass compositions that can be used to manufacture glass-based articles include a soda lime glass having a composition (in weight %) comprising $SiO_2$ 40-81%, $Al_2O_3$ 0-6%, $B_2O_3$ 0-5%, $Li_2O+Na_2O+K_2O$ 5-30%, $MgO+CaO+SrO+BaO+ZnO$ 5-30%, $TiO_2+ZrO_2$ 0-7%, and $P_2O_5$ 0-2%. In other embodiments, glass compositions that can be used to manufacture glass-based articles include a soda lime glass having a composition (in weight %) comprising $SiO_2$ 50-81%, $Al_2O_3$ 0-5%, $B_2O_3$ 0-5%, $Li_2O+Na_2O+K_2O$ 5-28%, $MgO+CaO+SrO+BaO+ZnO$ 5-25%, $TiO_2+ZrO_2$ 0-6%, and $P_2O_5$ 0-2%. In other embodiments, glass compositions that can be used to manufacture glass-based articles include a soda lime glass having a composition (in weight %) comprising $SiO_2$ 55-76%, $Al_2O_3$ 0-5%, $B_2O_3$ 0-5%, $Li_2O+Na_2O+K_2O$ 5-25%, $MgO+CaO+SrO+BaO+ZnO$ 5-20%, $TiO_2+ZrO_2$ 0-5%, and $P_2O_5$ 0-2%.

In other embodiments, glass compositions that can be used to manufacture glass-based articles include a borosilicate glass having a composition (in weight %) comprising $SiO_2$ 60-85%, $Al_2O_3$ 0-10%, $B_2O_3$ 5-20%, $Li_2O+Na_2O+K_2O$ 2-16%, $MgO+CaO+SrO+BaO+ZnO$ 0-15%, $TiO_2+ZrO_2$ 0-5%, and $P_2O_5$ 0-2%. In other embodiments, glass compositions that can be used to manufacture glass-based articles include a borosilicate glass having a composition (in weight %) comprising $SiO_2$ 63-84%, $Al_2O_3$ 0-8%, $B_2O_3$ 5-18%, $Li_2O+Na_2O+K_2O$ 3-14%, $MgO+CaO+SrO+BaO+ZnO$ 0-12%, $TiO_2+ZrO_2$ 0-4%, and $P_2O_5$ 0-2%. In other embodiments, glass compositions that can be used to manufacture glass-based articles include a borosilicate glass having a composition (in weight %) comprising $SiO_2$ 63-83%, $Al_2O_3$ 0-7%, $B_2O_3$ 5-18%, $Li_2O+Na_2O+K_2O$ 4-14%, $MgO+CaO+SrO+BaO+ZnO$ 0-10%, $TiO_2+ZrO_2$ 0-3%, and $P_2O_5$ 0-2%.

In other embodiments, glass compositions that can be used to manufacture glass-based articles include an alkali metal aluminosilicate glass having a composition (in weight %) comprising $SiO_2$ 40-75%, $Al_2O_3$ 10-30%, $B_2O_3$ 0-20%, $Li_2O+Na_2O+K_2O$ 4-30%, $MgO+CaO+SrO+BaO+ZnO$ 0-15%, $TiO_2+ZrO_2$ 0-15, and $P_2O_5$ 0-10%. In other embodiments, glass compositions that can be used to manufacture glass-based articles include an alkali metal aluminosilicate glass having a composition (in weight %) comprising $SiO_2$ 50-70%, $Al_2O_3$ 10-27%, $B_2O_3$ 0-18%, $Li_2O+Na_2O+K_2O$ 5-28%, $MgO+CaO+SrO+BaO+ZnO$ 0-13%, $TiO_2+ZrO_2$ 0-13%, and $P_2O_5$ 0-9%. In other embodiments, glass compositions that can be used to manufacture glass-based articles include an alkali metal aluminosilicate glass having a composition (in weight %) comprising $SiO_2$ 55-68%, $Al_2O_3$ 10-27%, $B_2O_3$ 0-15%, $Li_2O+Na_2O+K_2O$ 4-27%, $MgO+CaO+SrO+BaO+ZnO$ 0-12%, $TiO_2+ZrO_2$ 0-10%, and $P_2O_5$ 0-8%. In other embodiments, glass compositions that can be used to manufacture glass-based articles include a low alkali metal aluminosilicate glass having a composition (in weight %) comprising $SiO_2$ 50-75%, $Al_2O_3$ 7-25%, $B_2O_3$ 0-20%, $Li_2O+Na_2O+K_2O$ 0-4%, $MgO+CaO+SrO+BaO+ZnO$ 5-25%, $TiO_2+ZrO_2$ 0-10%, and $P_2O_5$ 0-5%. In other embodiments, glass compositions that can be used to manufacture glass-based articles include a low alkali metal aluminosilicate glass having a composition (in weight %) comprising $SiO_2$ 52-73%, $Al_2O_3$ 7-23, $B_2O_3$ 0-18%, $Li_2O+Na_2O+K_2O$ 0-4%, $MgO+CaO+SrO+BaO+ZnO$ 5-23%, $TiO_2+ZrO_2$ 0-10%, and $P_2O_5$ 0-5%. In other embodiments, glass compositions that can be used to manufacture glass-based articles include a low alkali metal aluminosilicate glass having a composition (in weight %) comprising $SiO_2$ 53-71%, $Al_2O_3$ 7-22%, $B_2O_3$ 0-18%, $Li_2O+Na_2O+K_2O$ 0-4%, $MgO+CaO+SrO+BaO+ZnO$ 5-22%, $TiO_2+ZrO_2$ 0-8%, and $P_2O_5$ 0-5%.

Glass and glass-ceramic compositions that can be chemically strengthened may be characterized as ion exchangeable. As used herein, "ion exchangeable" means that a substrate comprising the composition is capable of exchanging cations located at or near the surface of the substrate with cations of the same valence that are either larger or smaller in size. The glass compositions described above may be ion exchangeable. A specific example of a glass composition comprises $SiO_2$, $B_2O_3$, and $Na_2O$, where $(SiO_2+B_2O_3) \geq 66$ mol %, and $Na_2O \geq 9$ mol %. Suitable glass compositions, in some embodiments, further comprise at least one of $K_2O$, $MgO$, and $CaO$. In a particular embodiment, the glass compositions used in the substrate can comprise 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % $MgO$; and 0-3 mol % $CaO$.

A further specific example of glass composition suitable for the substrates or articles comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % $MgO$; 0-10 mol % $CaO$; 0-5 mol % $ZrO_2$; 0-1 mol % $SnO_2$; 0-1 mol % $CeO_2$; less than 50 ppm $As_2O_3$; and less than 50 ppm $Sb_2O_3$; where 12 mol % $\leq (Li_2O+Na_2O+K_2O) \leq 20$ mol %, and 0 mol % $\leq (MgO+CaO) \leq 10$ mol %.

A still further example glass composition suitable for the substrates or articles comprises: 63.5-66.5 mol % $SiO_2$; 8-12 mol % $Al_2O_3$; 0-3 mol % $B_2O_3$; 0-5 mol % $Li_2O$; 8-18 mol % $Na_2O$; 0-5 mol % $K_2O$; 1-7 mol % $MgO$; 0-2.5 mol % $CaO$; 0-3 mol % $ZrO_2$; 0.05-0.25 mol % $SnO_2$; 0.05-0.5 mol % $CeO_2$; less than 50 ppm $As_2O_3$; and less than 50 ppm $Sb_2O_3$; where 14 mol % $\leq (Li_2O+Na_2O+K_2O) \leq 18$ mol %, and 2 mol % $\leq (MgO+CaO) \leq 7$ mol %.

In a particular embodiment, an alkali aluminosilicate glass composition suitable for the substrates or articles comprises alumina, at least one alkali metal and, in some embodiments, greater than 50 mol % $SiO_2$, in other embodiments at least 58 mol % $SiO_2$, and in still other embodiments at least 60 mol % $SiO_2$, wherein the ratio $((Al_2O_3+B_2O_3)/\Sigma$ modifiers)>1, where in the ratio the components are expressed in mol % and the modifiers are alkali metal oxides. This glass composition, in particular embodiments, comprises: 58-72 mol % $SiO_2$; 9-17 mol % $Al_2O_3$; 2-12 mol % $B_2O_3$; 8-16 mol % $Na_2O$; and 0-4 mol % $K_2O$, wherein the ratio (($Al_2O_3+B_2O_3$)/Σ modifiers)>1.

In still another embodiment, the substrates or articles may include an alkali aluminosilicate glass composition comprising: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % MgO; and 0-5 mol % CaO, wherein: 66 mol %≤$SiO_2+B_2O_3$+CaO≤69 mol %; $Na_2O+K_2O+B_2O_3$+MgO+CaO+CaO+SrO>10 mol %; 5 mol %≤MgO+CaO+SrO≤8 mol %; ($Na_2O+B_2O_3$)—$Al_2O_3$≤2 mol %; 2 mol %≤$Na_2O$—$Al_2O_3$≤6 mol %; and 4 mol %≤($Na_2O+K_2O$)—$Al_2O_3$≤10 mol %.

In an alternative embodiment, the substrates or articles may comprise an alkali aluminosilicate glass composition comprising: 2 mol % or more of $Al_2O_3$ and/or $ZrO_2$, or 4 mol % or more of $Al_2O_3$ and/or $ZrO_2$.

In embodiments that include strengthened glass/glass-ceramic articles, such strengthened articles may be chemically strengthened by an ion exchange process. In the ion-exchange process, typically by immersion of a glass-based substrate into a molten salt bath for a predetermined period of time, ions at or near the surface(s) of the glass or glass-ceramic substrate are exchanged for larger metal ions from the salt bath. In one embodiment, the temperature of the molten salt bath is about 400° C. to 480° C. and the predetermined time period is about fifteen minutes to about twenty-four hours. The incorporation of the larger ions into the glass or glass-ceramic substrate strengthens the substrate by creating a compressive stress in a near surface region or in regions at and adjacent to the surface(s) of the substrate. A corresponding tensile stress is induced within a central region or regions at a distance from the surface(s) of the substrate to balance the compressive stress. Glass or glass-ceramic substrates utilizing this strengthening process may be described more specifically as chemically-strengthened or ion-exchanged glass or glass-ceramic substrates.

In one example, sodium ions in a strengthened glass-based substrate are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass or glass-ceramic can be replaced by Ag+ ions to provide an antimicrobial effect. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened substrate that results in a stress profile. The larger volume of the incoming ion produces a compressive stress (CS) on the surface and tension (central tension, or CT) in the center of the strengthened substrate.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. In one or more embodiments, the glass-based substrate can have a surface compressive stress of 750 MPa or greater, e.g., 800 MPa or greater, 850 MPa or greater, 900 MPa or greater, 950 MPa or greater, 1,000 MPa or greater, 1,150 MPa or greater, or 1,200 MPa.

As used herein, DOC means the depth at which the stress in the chemically strengthened alkali aluminosilicate glass article described herein changes from compressive to tensile. DOC may be measured by FSM (such as by surface stress meter (FSM) using commercially available instruments such as the FSM-6000, manufactured by Orihara Industrial Co., Ltd. (Japan)) or a scattered light polariscope (SCALP) depending on the ion exchange treatment. Where the stress in the glass article is generated by exchanging potassium ions into the glass article, FSM is used to measure DOL. Where the stress is generated by exchanging sodium ions into the glass article, SCALP is used to measure DOL. Where the stress in the glass article is generated by exchanging both potassium and sodium ions into the glass, the DOL is measured by SCALP, since it is believed the exchange depth of sodium indicates the DOL and the exchange depth of potassium ions indicates a change in the magnitude of the compressive stress (but not the change in stress from compressive to tensile); the exchange depth of potassium ions in such glass articles is measured by FSM.

Examples of glass compositions are provided above. In specific embodiments, glass compositions disclosed in U.S. Pat. No. 9,156,724 ("the '724 patent") may be used to form glass substrates or articles. The '724 patent discloses alkali aluminosilicate glasses that are resistant to damage due to sharp impact and capable of fast ion exchange. Examples of such alkali aluminosilicate glasses comprise at least 4 mol % $P_2O_5$ and, when ion exchanged, have a Vickers crack initiation threshold of at least about 3 kgf, of at least about 4 kgf, of at least about 5 kgf, of at least about 6 kgf or of at least about 7 kgf. In one or more specific embodiments, the first strengthened substrate comprises an alkali aluminosilicate glass comprising at least about 4 mol % $P_2O_5$, and from 0 mol % to about 4 mol % $B_2O_3$, wherein the alkali aluminosilicate glass is free of $Li_2O$, and 1.3<[$P_2O_5+R_2O$/$M_2O_3$]≤2.3; where $M_2O_3=Al_2O_3+B_2O_3$, and $R_2O$ is the sum of monovalent cation oxides present in the alkali aluminosilicate glass. In specific embodiments, such alkali aluminosilicate glasses comprise less than 1 mol % $K_2O$, for example 0 mol % $K_2O$. In specific embodiments, such alkali aluminosilicate glasses comprise less than 1 mol % $B_2O_3$, for example 0 mol % $B_2O_3$. In specific embodiments, such alkali aluminosilicate glasses are ion exchanged to a depth of layer of at least about 10 μm, and the alkali aluminosilicate glass has a compressive layer extending from a surface of the glass to the depth of layer, and wherein the compressive layer is under a compressive stress of at least about 300 MPa. In specific embodiments, such alkali aluminosilicate glasses include monovalent and divalent cation oxides are selected from the group consisting of $Na_2O$, $K_2O$, $Rb_2O$, $Cs_2O$, MgO, CaO, SrO, BaO, and ZnO. In highly specific embodiments, such alkali aluminosilicate glasses comprise from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. Glass substrates or articles made from the glass composition described immediately above can be ion-exchanged.

Figure 6A:
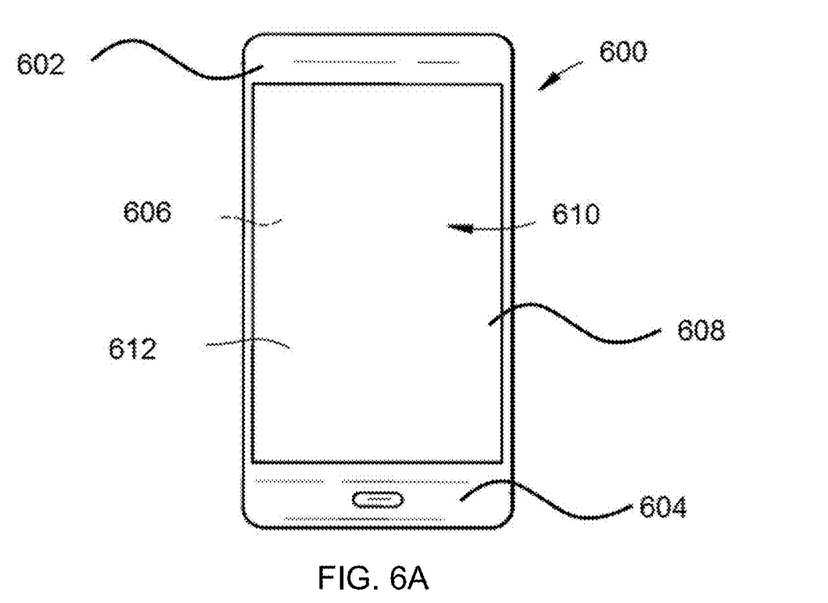
FIG. 6A is a plan view of an exemplary electronic device incorporating any of the glass-based articles disclosed herein.
Figure 6B:
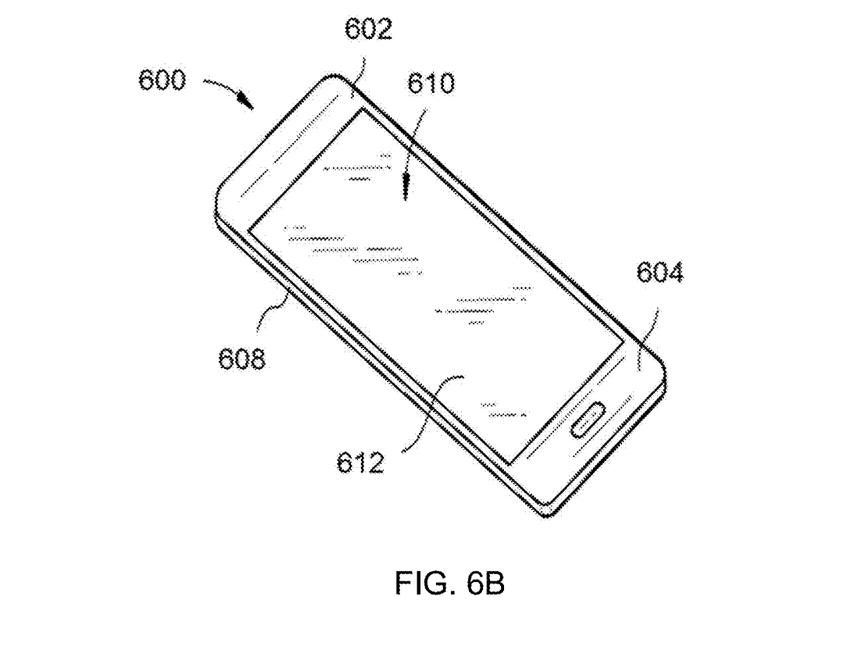
FIG. 6B is a perspective view of the exemplary electronic device of FIG. 6A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 6A and 6B. Specifically, FIGS. 6A and 6B show a consumer electronic device 600 including a housing 602 having front 604, back 606, and side surfaces 608; electrical components (not shown) that are at least partially inside or entirely within the housing and including at least a controller, a memory, and a display 610 at or adjacent to the front surface of the housing; and a cover substrate 612 at or over the front surface of the housing such that it is over the display. In some embodiments, the cover substrate 612 and/or the housing 602 may include any of the glass-based articles disclosed herein.

EXAMPLES

Exemplary glass-based articles were produced according to the methods described above.

Example 1

A planar alkali aluminum phosphosilicate glass substrate containing about 0.003 mol % to about 0.005 mol % Au and about 0.04 mol % $CeO_2$ was produced. The bulk composition of the glass substrate prior to the addition of the Au and $CeO_2$ was approximately: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$.

Figure 2:
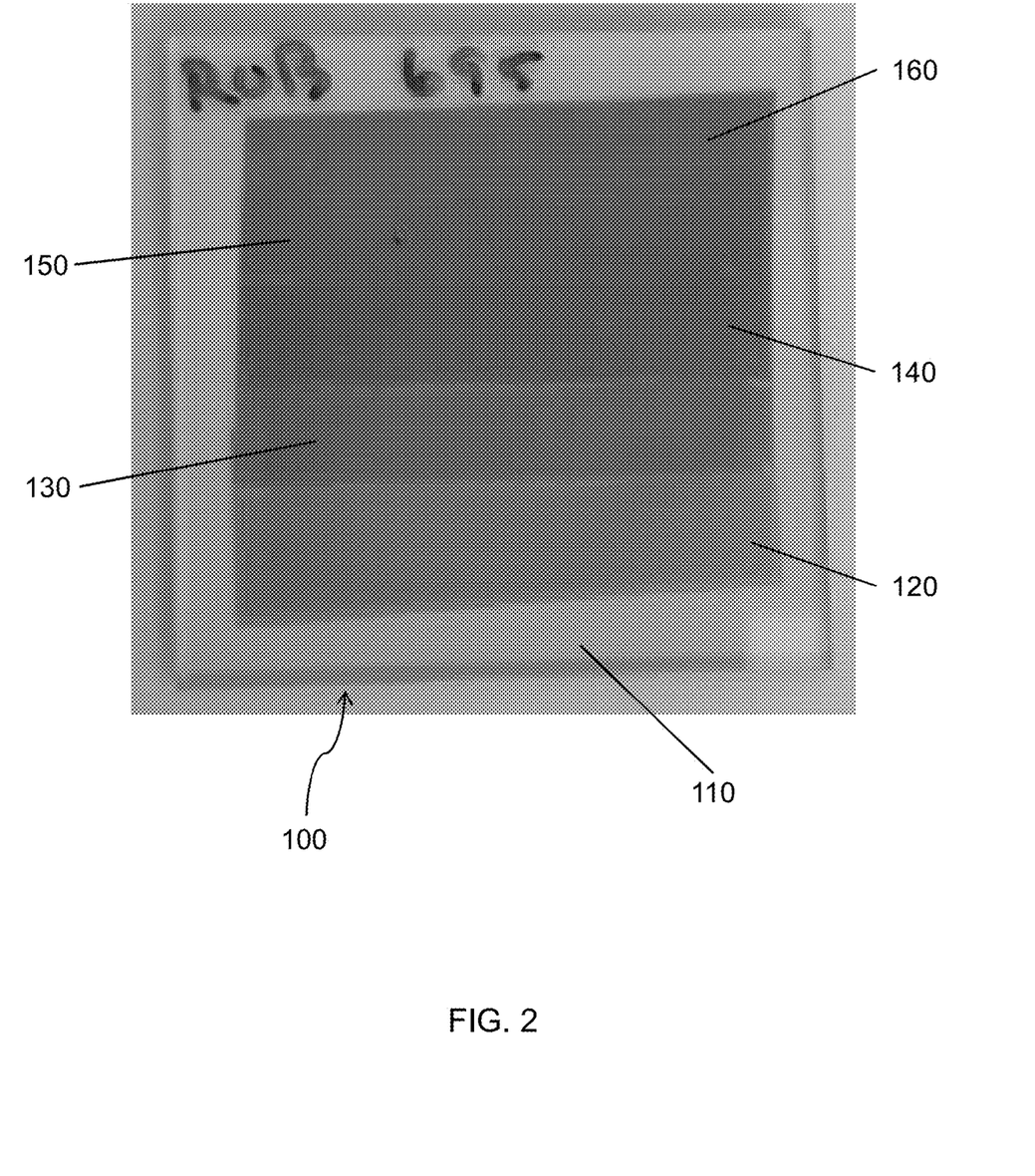
FIG. 2 is a color photograph of a multi-colored glass-based article that has been exposed to UV radiation and heat treated, with areas exposed to UV radiation for various times.

Various regions of the glass substrate were exposed to a UV source for different exposure periods, and the glass substrate was then heat treated to produce colored regions. As shown in FIG. 2, the glass substrate 100 included a colorless region 110 that was not exposed to the UV radiation. Region 120 was exposed for 30 minutes, region 130 was exposed for 1 hour, region 140 was exposed for 2 hours, region 150 was exposed for 3 hours, and region 160 was exposed for 4 hours. FIG. 2 demonstrates that increasing exposure times produced a gradual transition from blue colors to pink colors.

Example 2

Figure 3:
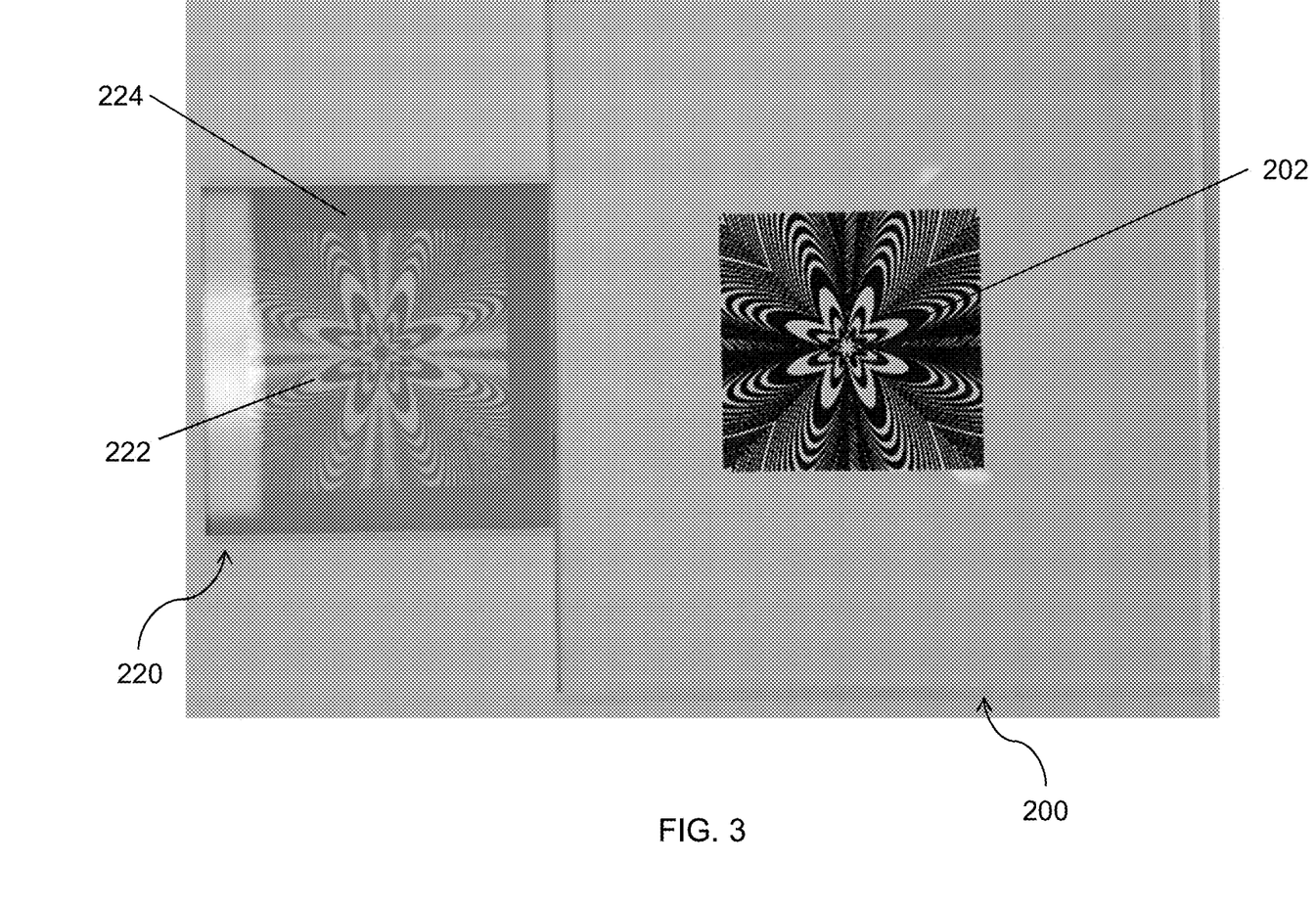
FIG. 3 is a color photograph of a mask and a multi-colored glass-based article produced by using the mask to limit the areas of the glass-based article exposed to UV radiation, followed by subsequent heat treatment.

A planar alkali aluminum phosphosilicate glass substrate 220 of the type described in Example 1 was produced, and selectively exposed to UV radiation with the use of a mask 200. The exposed glass substrate was then heat treated to produce a colored region as shown I FIG. 3. The mask included UV radiation opaque regions 202. The opaque regions 202 of the mask produced regions of the glass substrate that were not exposed to the UV radiation and remained colorless 222. The regions of the glass substrate that were not blocked by the opaque regions 202 of the mask exhibited a pink color 224. This example demonstrates that colored regions with complex shapes may be produced in the glass-based articles described herein.

Example 3

Figure 4:
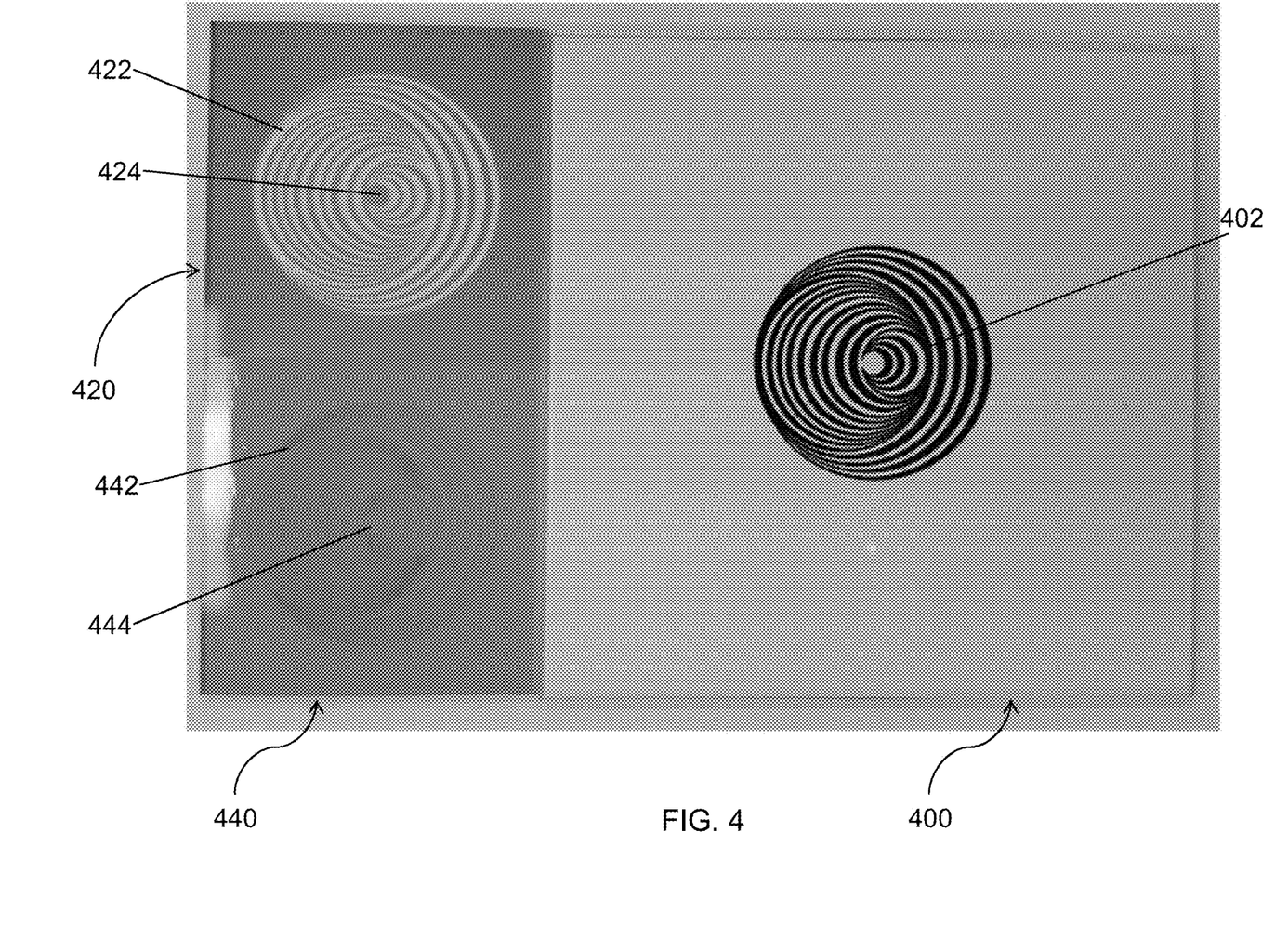
FIG. 4 is a color photograph of a mask, a multi-colored glass-based article produced by using the mask to limit the areas of the glass-based article exposed to UV radiation and subsequent heat treatment, and a multi-colored glass-based article produced by using the mask to limit the areas of the glass-based article exposed to UV radiation followed by exposure to UV radiation without limitation of the mask and subsequent heat treatment.

A planar alkali aluminum phosphosilicate glass substrate 420 of the type described in Example 1 was produced, and selectively exposed to UV radiation with the use of a mask 400 for 4 hours. A second planar alkali aluminum phosphosilicate glass substrate 440 was produced in the same manner, and then exposed to UV radiation from the back surface (opposite the mask) of the glass substrate 440 for 30 minutes. The exposed glass substrates were then heat treated to produce colored regions as shown in FIG. 4. The mask 400 included UV radiation opaque regions 402. The opaque regions 402 of the mask produced regions of the first glass substrate 420 that were not exposed to the UV radiation and remained colorless 422. The regions of the first glass substrate that were not blocked by the opaque regions 402 of the mask exhibited a pink color 424. The second glass substrate 440 exhibits blue regions 442 where the glass substrate was not exposed during the first UV radiation exposure, and a truer red color 444 due to the reduction in blue hue in regions that were exposed to the UV radiation during both the front and back side UV radiation exposures.

Example 4

Figure 5:
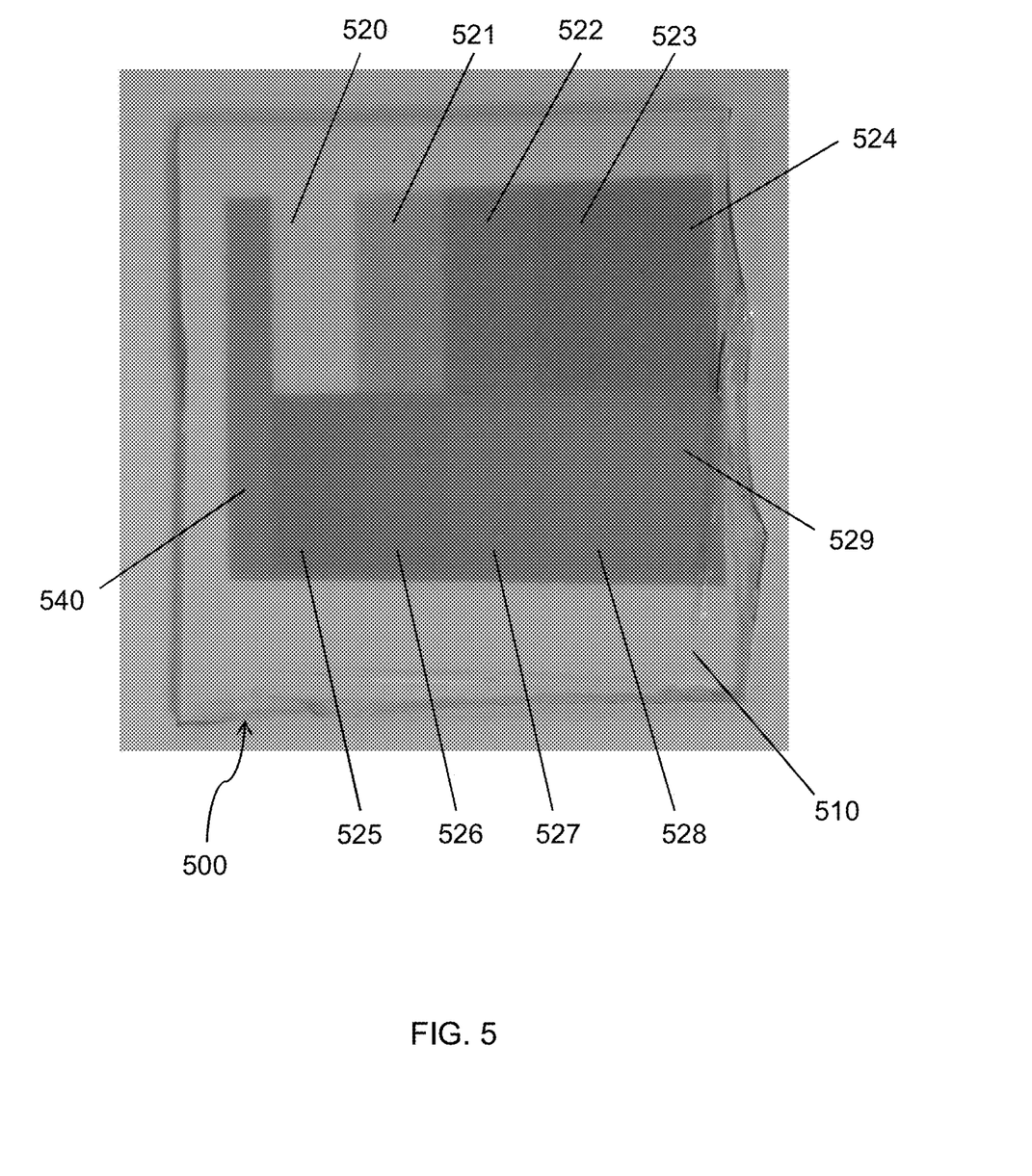
FIG. 5 is a color photograph of a multi-colored glass-based article produced using a mask with various UV radiation opacities.

A planar alkali aluminum phosphosilicate glass substrate 500 of the type described in Example 1 was produced, and selectively exposed to 10 mW UV radiation for 3 hours with the use of a mask that included 10 regions of increasing opacity. The exposed glass substrate was then heat treated by ramping from room temperature to 675° C. at a rate of 15° C. per minute, and then held at 675° C. for 1 hour before cooling to room temperature to produce colored regions as shown in FIG. 5. A region of the glass substrate that was not blocked by the mask exhibited a pink color 540, and a region of the glass substrate that was not exposed to the UV radiation was colorless 510. The measured $L^*$, hue angle (h), saturation value (C), $a^*$, $b^*$ are reported in Table 1 below. The colors produced transition from pale blue for the most opaque mask region 520 to pink for the least opaque mask region 529.

TABLE 1

| Position | L* | C | h | a* | b* |
|---|---|---|---|---|---|
| 520 | 85.47 | 1.54 | 179.63 | −1.54 | 0.01 |
| 521 | 73.32 | 8.01 | 252.94 | −2.35 | −7.66 |
| 522 | 63.10 | 15.82 | 306.59 | 9.43 | −12.70 |
| 523 | 60.90 | 23.29 | 331.71 | 20.51 | −11.04 |
| 524 | 61.05 | 28.01 | 342.29 | 26.68 | −8.52 |
| 525 | 61.07 | 32.18 | 349.20 | 31.61 | −6.03 |
| 526 | 61.89 | 34.28 | 353.74 | 34.08 | −3.74 |
| 527 | 62.64 | 36.13 | 356.86 | 36.08 | −1.98 |
| 528 | 64.03 | 38.63 | 1.29 | 38.62 | 0.87 |
| 529 | 64.12 | 38.78 | 2.13 | 38.75 | 1.44 |

Various embodiments are described below. These embodiments include:

1. A first embodiment comprises a glass-based article comprising differently sized metallic particles in a glass-based composition, the differently sized metallic particles forming multicolored regions in the glass based composition providing two regions having different color from each other.

2. The glass-based article of embodiment 1, wherein the multicolored regions comprise islands of metallic particles selected from the group consisting of gold, silver, palladium, copper and combinations thereof, wherein a first island of metallic particles has an average particle size different from a second island of metallic parties.

3. The glass-based article of embodiment 1 or 2, wherein the glass-based composition further comprises cerium.

4. The glass-based article of embodiment 2, wherein the first island of metallic particles and second island of metallic particles have different average particle sizes as a result of exposure to different electromagnetic radiation.

5. The glass based article of embodiment 4, wherein the radiation is selected from the group consisting of visible light, infrared light, ultraviolet light and extreme ultraviolet light.

6. The glass based article of any of embodiments 2-5, wherein the first island of metallic particles and second island of metallic particles are in a pattern.

7. The glass based article of any of embodiments 2-6, wherein the glass-based article has been heat-treated.

8. The glass-based article of any of embodiments 1-7, wherein the metallic particles sized to provide color to the glass-based article.

9. The glass-based article of any of embodiments 1-8, wherein a range of colors in achieved in the glass-based article.

10. The glass-based article of embodiment 9, wherein the range of colors is from blue to red.

11. The glass-based article of any of embodiments 1-10, further comprising an ion-exchangeable glass composition.

12. The glass-based article of embodiment 11, wherein the glass has a CS>100 MPa and a DOL>5 micrometers.

13. The glass-based article of any of embodiments 1-12, further comprising a surface modified to provide a textured surface 14. The glass-based article of any of embodiments 1-12, wherein the glass based article is in the form of a sheet.

15. The glass based article embodiment 14, wherein the sheet is formed by one of fusion forming, slot draw, rolled sheet, updraw, and float.

16. The glass-based article of any of embodiments 1-12, wherein the article is a glass or glass-ceramic.

17. The glass-based article of any of embodiments 1-16, wherein the color in different regions differs based on the different regions receiving different exposure time for a fixed intensity light source.

18. The glass-based article of any of embodiments 1-16, wherein the color in different regions differs based on different regions being exposed to different light intensity.

19. The glass-based article of any of embodiments 1-18, wherein the color is achieved by exposure to radiation when the glass-based composition is at a viscosity high enough such that subsequent polishing is not required.

20. The glass-based article of any of embodiments 1-19, wherein the glass also contains large enough particles such that a Lycurgus effect is achieved with varying color in transmission and reflection.

21. The glass-based article of any of embodiments 1-20, wherein the article is equal to or less than 3 mm thick 22. The glass-based article of any of embodiments 1-20, wherein where the article is equal to or less than 2 mm thick 23. The glass-based article of any of embodiments 1-20, wherein the article is equal to or less than 1.5 mm thick 24. The glass-based article of any of embodiments 1-20, wherein the article is equal to or less than 1 mm thick 25. The glass-based article of any of embodiments 1-20, wherein the article is equal to or less than 0.7 mm thick 26. The glass-based article of any of embodiments 1-20, wherein the article is equal to or less than 0.5 mm thick.

27. The glass-based article of any of embodiments 1-26, wherein the multicolored regions were formed using a mask made by inkjet printing the pattern onto a piece of glass.

28. The glass-based article of embodiment 27, wherein the inkjet printing was done on a highly UV transparent piece of glass.

29. The glass-based article of any of embodiments 1-28, comprising a glass composition selected from soda lime glasses, aluminosilicate glasses, alkali aluminosilicate glasses, borosilicate glasses, aluminoborosilicate glasses, and alkali aluminoborosilicate glasses.

30. The glass-based article of any of embodiments 1-28, comprising a lithium aluminosilicate glass having a composition (in wt %) comprising $SiO_2$ 55-69%, $Al_2O_3$ 18-25%, $Li_2O$ 3-5%, $Na_2O+K_2O$ 0-30%, $MgO+CaO+SrO+BaO$ 0-5%, $ZnO$ 0-4%, $TiO_2$ 0-5%, $ZrO_2$ 0-5, $TiO_2+ZrO_2+SnO_2$ 2-6%, $P_2O_5$ 0-8%, F 0-1%, and $B_2O_3$ 0-2%.

31. The glass-based article of any of embodiments 1-28, comprising a lithium aluminosilicate glass having a composition (in wt %) comprising $SiO_2$ 57-66%, $Al_2O_3$ 18-23%, $Li_2O$ 3-5%, $Na_2O+K_2O$ 3-25%, $MgO+CaO+SrO+BaO$ 1-4%, $ZnO$ 0-4%, $TiO_2$ 0-4%, $ZrO_2$ 0-5%, $TiO_2+ZrO_2+SnO_2$ 2-6%, $P_2O_5$ 0-7%, F 0-1%, and $B_2O_3$ 0-2%.

32. The glass-based article of any of embodiments 1-28, comprising a lithium aluminosilicate glass having a composition (in wt %) comprising $SiO_2$ 57-63%, $Al_2O_3$ 18-22%, $Li_2O$ 3.5-5%, $Na_2O+K_2O$ 5-20%, $MgO+CaO+SrO+BaO$ 0-5%, $ZnO$ 0-3%, $TiO_2$ 0-3%, $ZrO_2$ 0-5%, $TiO_2+ZrO_2+SnO_2$ 2-5%, $P_2O_5$ 0-5%, F 0-1%, and $B_2O_3$ 0-2%.

33. The glass-based article of any of embodiments 1-28, comprising a soda lime glass having a composition (in wt %) comprising $SiO_2$ 40-81%, $Al_2O_3$ 0-6%, $B_2O_3$ 0-5%, $Li_2O+Na_2O+K_2O$ 5-30%, $MgO+CaO+SrO+BaO+ZnO$ 5-30%, $TiO_2+ZrO_2$ 0-7%, and $P_2O_5$ 0-2%.

34. The glass-based article of any of embodiments 1-28, comprising a soda lime glass having a composition (in wt %) comprising $SiO_2$ 50-81%, $Al_2O_3$ 0-5%, $B_2O_3$ 0-5%, $Li_2O+Na_2O+K_2O$ 5-28%, $MgO+CaO+SrO+BaO+ZnO$ 5-25%, $TiO_2+ZrO_2$ 0-6%, and $P_2O_5$ 0-2%.

35. The glass-based article of any of embodiments 1-28, comprising a soda lime glass having a composition (in wt %) comprising $SiO_2$ 55-76%, $Al_2O_3$ 0-5%, $B_2O_3$ 0-5%, $Li_2O+Na_2O+K_2O$ 5-25%, $MgO+CaO+SrO+BaO+ZnO$ 5-20%, $TiO_2+ZrO_2$ 0-5%, and $P_2O_5$ 0-2%.

36. The glass-based article of any of embodiments 1-28, comprising a borosilicate glass having a composition (in wt %) comprising $SiO_2$ 60-85%, $Al_2O_3$ 0-10%, $B_2O_3$ 5-20%, $Li_2O+Na_2O+K_2O$ 2-16%, $MgO+CaO+SrO+BaO+ZnO$ 0-15%, $TiO_2+ZrO_2$ 0-5%, and $P_2O_5$ 0-2%.

37. The glass-based article of any of embodiments 1-28, comprising a borosilicate glass having a composition (in wt %) comprising $SiO_2$ 63-84%, $Al_2O_3$ 0-8%, $B_2O_3$ 5-18%, $Li_2O+Na_2O+K_2O$ 3-14%, $MgO+CaO+SrO+BaO+ZnO$ 0-12%, $TiO_2+ZrO_2$ 0-4%, and $P_2O_5$ 0-2%.

38. The glass-based article of any of embodiments 1-28, comprising a borosilicate glass having a composition (in wt %) comprising $SiO_2$ 63-83%, $Al_2O_3$ 0-7%, $B_2O_3$ 5-18%, $Li_2O+Na_2O+K_2O$ 4-14%, $MgO+CaO+SrO+BaO+ZnO$ 0-10%, $TiO_2+ZrO_2$ 0-3%, and $P_2O_5$ 0-2%.

39. The glass-based article of any of embodiments 1-28, comprising an alkali metal aluminosilicate glass having a composition (in wt %) comprising $SiO_2$ 40-75%, $Al_2O_3$ 10-30%, $B_2O_3$ 0-20%, $Li_2O+Na_2O+K_2O$ 4-30%, $MgO+CaO+SrO+BaO+ZnO$ 0-15%, $TiO_2+ZrO_2$ 0-15%, and $P_2O_5$ 0-10%.

40. The glass-based article of any of embodiments 1-28, comprising an alkali metal aluminosilicate glass having a composition (in wt %) comprising $SiO_2$ 50-70%, $Al_2O_3$ 10-27%, $B_2O_3$ 0-18%, $Li_2O+Na_2O+K_2O$ 5-28%, MgO+CaO+SrO+BaO+ZnO 0-13%, $TiO_2+ZrO_2$ 0-13%, and $P_2O_5$ 0-9.

41. The glass-based article of any of embodiments 1-28, comprising an alkali metal aluminosilicate glass having a composition (in wt %) comprising $SiO_2$ 55-68%, $Al_2O_3$ 10-27%, $B_2O_3$ 0-15%, $Li_2O+Na_2O+K_2O$ 4-27%, MgO+CaO+SrO+BaO+ZnO 0-12%, $TiO_2+ZrO_2$ 0-10%, and $P_2O_5$ 0-8%.

42. The glass-based article of any of embodiments 1-28, comprising a low alkali metal aluminosilicate glass having a composition (in wt %) comprising $SiO_2$ 50-75%, $Al_2O_3$ 7-25%, $B_2O_3$ 0-20%, $Li_2O+Na_2O+K_2O$ 0-4%, MgO+CaO+SrO+BaO+ZnO 5-25%, $TiO_2+ZrO_2$ 0-10%, and $P_2O_5$ 0-5%.

43. The glass-based article of any of embodiments 1-28, comprising a low alkali metal aluminosilicate glass having a composition (in wt %) comprising $SiO_2$ 52-73%, $Al_2O_3$ 7-23%, $B_2O_3$ 0-18%, $Li_2O+Na_2O+K_2O$ 0-4%, MgO+CaO+SrO+BaO+ZnO 5-23%, $TiO_2+ZrO_2$ 0-10%, and $P_2O_5$ 0-5%.

44. The glass-based article of any of embodiments 1-28, comprising a low alkali metal aluminosilicate glass having a composition (in wt %) comprising $SiO_2$ 53-71%, $Al_2O_3$ 7-22%, $B_2O_3$ 0-18%, $Li_2O+Na_2O+K_2O$ 0-4%, MgO+CaO+SrO+BaO+ZnO 5-22%, $TiO_2+ZrO_2$ 0-8%, and $P_2O_5$ 0-5%.

45. The glass-based article of any of embodiments 1-28, comprising a glass including $SiO_2$, $B_2O_3$, and $Na_2O$, where $(SiO_2+B_2O_3) \geq 66$ mol %, and $Na_2O \geq 9$ mol %.

46. The glass-based article of any of embodiments 1-28, comprising a glass including 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO.

47. The glass-based article of any of embodiments 1-28, comprising a glass including 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; where 12 mol % $\leq (Li_2O+Na_2O+K_2O) \leq 20$ mol % and 0 mol % $\leq (MgO+CaO) \leq 10$ mol %.

48. The glass-based article of any of embodiments 1-28, comprising a glass including 63.5-66.5 mol % $SiO_2$; 8-12 mol % $Al_2O_3$; 0-3 mol % $B_2O_3$; 0-5 mol % $Li_2O$; 8-18 mol % $Na_2O$; 0-5 mol % $K_2O$; 1-7 mol % MgO; 0-2.5 mol % CaO; 0-3 mol % $ZrO_2$; 0.05-0.25 mol % $SnO_2$; 0.05-0.5 mol % $CeO_2$; less than 50 ppm $As_2O_3$; and less than 50 ppm $Sb_2O_3$; where 14 mol % $\leq (Li_2O+Na_2O+K_2O) \leq 18$ mol %, and 2 mol % $\leq (MgO+CaO) \leq 7$ mol %.

49. The glass-based article of any of embodiments 1-28, comprising a glass including 58-72 mol % $SiO_2$; 9-17 mol % $Al_2O_3$; 2-12 mol % $B_2O_3$; 8-16 mol % $Na_2O$; and 0-4 mol % $K_2O$, wherein the ratio $((Al_2O_3+B_2O_3)/\Sigma \text{ modifiers}) > 1$.

50. The glass-based article of any of embodiments 1-49, wherein the glass-based article comprises a glass composition containing from 0.001 mol % to about 0.005 mol % gold.

51. The glass-based article of any of embodiments 1-49, wherein the glass-based article comprises a glass composition containing from 0.001 mol % to about 0.005 mol % gold.

52. A mobile device comprising the glass based article of any of embodiments 1-51, the mobile device selected from mobile phone, a tablet, and a music player.

53. A method of making glass-based article comprising differently sized metallic particles in a glass-based composition, the differently sized metallic particles forming multicolored regions in the glass based composition providing two regions having different color from each other, the method comprising exposing a first region of a glass-based part to radiation and exposing a second region of the glass-based part to radiation, wherein the first and second regions are exposed to one or more of different intensities of radiation or to a different duration of exposure, resulting in differently sized metallic particles in the first region and the second region.

54. The method of embodiment 53, wherein the multicolored regions comprise islands of metallic particles selected from the group consisting of gold, silver, palladium, copper and combinations thereof, wherein a first island of metallic particles has an average particle size different from a second island of metallic parties.

55. The method of any of embodiments 53-54, wherein the glass-based composition further comprises cerium.

56 The method of any of embodiments 53-55, the radiation is selected from the group consisting of visible light, infrared light, ultraviolet light and extreme ultraviolet light.

57. The method of any of embodiments 53-56, wherein the first island of metallic particles and second island of metallic particles are in a pattern.

58. The method of any of embodiments 53-57, further comprising heat treating the glass-based article.

59. The method of any of embodiments 53-58, wherein the metallic particles sized to provide color to the glass-based article.

60. The method of any of embodiments 53-59, wherein a range of colors in achieved in the glass-based article.

61. The method of any of embodiments 53-60, wherein the range of colors is from blue to red.

62. The method of any of embodiments 53-61, further modifying a surface of the glass based article to provide e a textured surface.

63. The method of any of embodiments 53-62 further comprising forming the glass based article into a sheet by one of fusion forming, slot draw, rolled sheet, updraw, and float.

64. The method of any of embodiments 53-63, wherein the color in different regions differs based on the different regions receiving different exposure time for a fixed intensity light source.

65. The method of any of embodiments 53-63, wherein the color in different regions differs based on different regions being exposed to different light intensity.

66. The method of any of embodiments 53-65, wherein the color is achieved by exposure to radiation when the glass-based composition is at a viscosity high enough such that subsequent polishing is not required.

67. The method of any of embodiments 53-66, wherein the glass also contains large enough particles such that a Lycurgus effect is achieved with varying color in transmission and reflection.

68. The method of any of embodiments 53-67, further comprising forming a pattern onto a piece of the glass-based article, 69. The method of embodiment 68, wherein the pattern is formed by inkjet printing.

70. The method of embodiment 68 or 69, wherein the glass-based article comprises a highly UV transparent piece of glass.

While the foregoing is directed to various embodiments, other and further embodiments of the disclosure may be devised without departing from the basic scope thereof, and the scope thereof is determined by the claims that follow.

What is claimed is:

1. An article, comprising:
a glass substrate comprising greater than or equal to 10 mol % $Al_2O_3$;
wherein the glass substrate comprises:
a first region containing metallic nanoparticles of a component with a first average particle diameter, wherein the first average particle diameter is in the range of 1 nm to 1,000 nm; and
a second region containing metallic nanoparticles of the component with a second average particle diameter that is different than the first average particle diameter, wherein the second average particle diameter is in the range of 1 nm to 1,000 nm.

2. The article of claim 1, wherein the glass substrate comprises:
40-85 mol % $SiO_2$;
10-30 mol % $Al_2O_3$;
0-20 mol % $B_2O_3$;
0-10 mol % $P_2O_5$;
0-30 mol % $Li_2O+Na_2O+K_2O+Rb_2O$;
0-30 mol % $MgO+CaO+SrO+BaO$;
0-10 mol % of ZnO;
0-10 mol % $ZrO_2$;
0-10 mol % $Y_2O_3$;
0-10 mol % $La_2O_3$;
0-10 mol % NiO;
>0-5 mol % Au; and
0-5 mol % of $CeO_2$.

3. The article of claim 1, wherein the glass substrate comprises:
55-75 mol % $SiO_2$;
10-20 mol % $Al_2O_3$;
0-5 mol % $B_2O_3$;
0-5 mol % $P_2O_5$;
10-25 mol % $Li_2O+Na_2O+K_2O+Rb_2O$;
0-10 mol % $MgO+CaO+SrO+BaO$;
0-5 mol % of ZnO;
0-5 mol % $ZrO_2$;
0-5 mol % $Y_2O_3$;
0-5 mol % $La_2O_3$;
0-5 mol % NiO;
0.001-0.1 mol % Au; and
>0-1 mol % of $CeO_2$.

4. The article of claim 1, wherein the component is selected from the group consisting of Au, Ag, and Cu.

5. The article of claim 1, wherein the component is Au.

6. The article of claim 1, wherein the glass substrate further comprises a photosensitizer.

7. The article of claim 1, wherein the glass substrate further comprises $CeO_2$.

8. The article of claim 1, wherein the first region has a hue angle outside the range of 90° to 170°.

9. The article of claim 1, wherein the glass substrate further comprises a region that is substantially free of metallic nanoparticles of the component and is substantially colorless.

10. The article of claim 1, wherein the second region has a hue angle that is different than a hue angle of the first region.

11. The article of claim 1, wherein the glass substrate further comprises a third region containing metallic nanoparticles of the component with a third average particle diameter, and the third average particle diameter is different than the first average particle diameter and the second average particle diameter, wherein the third average particle diameter is in the range of 1 nm to 1,000 nm.

12. The article of claim 1, wherein the first average particle diameter is 50 nm to 250 nm.

13. The article of claim 1, wherein the glass substrate comprises a compressive stress layer extending from a surface of the glass substrate to a depth of compression.

14. The article of claim 1, wherein the glass substrate has a thickness of less than 3 mm.

15. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover glass disposed over the display,
wherein at least one of a portion of the housing or the cover glass comprises the article of claim 1.

* * * * *